C. W. STARKER.
FIELD COIL SUPPORT.
APPLICATION FILED MAR. 13, 1911.
1,086,096.
Patented Feb. 3, 1914.
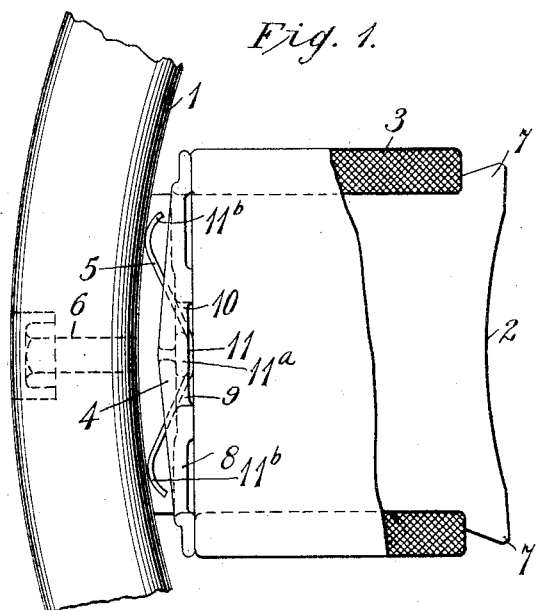
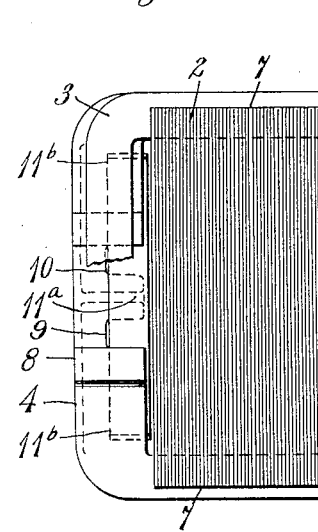
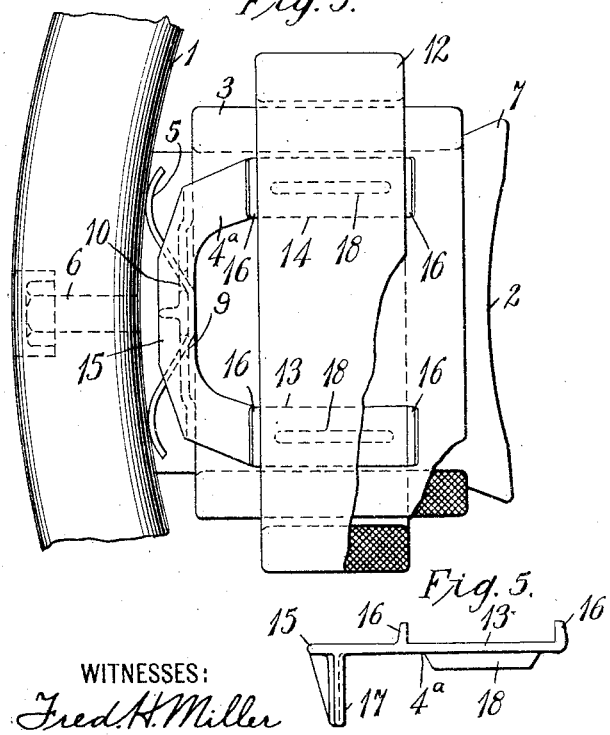
WITNESSES:
Fred H. Miller
D. H. Mace
INVENTOR
Charles W. Starker
BY
Whaley G. Carr
ATTORNEY

UNITED STATES PATENT OFFICE.

CHARLES WILLIAM STARKER, OF PITTSBURGH, PENNSYLVANIA, ASSIGNOR TO WESTINGHOUSE ELECTRIC AND MANUFACTURING COMPANY, A CORPORATION OF PENNSYLVANIA.

FIELD-COIL SUPPORT.

1,086,096.  Specification of Letters Patent.  Patented Feb. 3, 1914.

Application filed March 13, 1911. Serial No. 614,251.

*To all whom it may concern:*

Be it known that I, CHARLES W. STARKER, a subject of the Emperor of Germany, and a resident of Pittsburgh, in the county of Allegheny and State of Pennsylvania, have invented a new and useful Improvement in Field-Coil Supports, of which the following is a specification.

My invention relates to dynamo-electric machines, and it has particular reference to field coil supports therefor.

The object of my invention is to provide a simple and effective means for supporting the field coils of a machine of the above-indicated class which shall be inexpensive and durable in construction, and shall embody an element of resiliency by means of which the usual chattering and vibrations of the field coils are eliminated, and variations in the heights of the coils may be taken up.

Another object of my invention is to provide suitable means, of the type hereinbefore mentioned, which shall be particularly adapted for use in connection with dynamo-electric machines having series field coils surrounding the main field coils, said means not only being adapted to serve the purposes hereinbefore recited but, in addition, to support the series field coils.

In the accompanying drawing, Figure 1 is a view, partially in elevation and partially in section, of a portion of a stationary field magnet structure of a dynamo-electric machine which embodies my invention. Fig. 2 is a face view of a portion of the structure shown in Fig. 1, a portion of the field coil being removed for clearness. Fig. 3 is a view similar to Fig. 1 and illustrates a modification of my invention. Fig. 4 is a view similar to Fig. 2 of a portion of the structure shown in Fig. 3, and Fig. 5 is an end view of the supporting grid shown in Figs. 3 and 4.

Particular reference may now be had to Figs. 1 and 2, in which the structure shown comprises a magnetizable frame or yoke 1, having a plurality of polar projections 2, main field coils 3, grid members 4 and springs 5.

The field magnet yoke 1 and the polar projections 2 are of old and familiar construction and no detailed description thereof is considered necessary, the polar projections being removably secured to the yoke or frame 1, in the usual manner, by means of bolts 6.

The field coil 3, which comprises a plurality of convolutions of wire conductor which is wound and bound together in the customary manner, is disposed upon the polar projection 2 and rests against the pole tips 7 thereof.

The grid member 4 is substantially rectangular in shape and is of frame structure, said grid surrounding the polar projection 2 and resting upon the adjacent end of the field coil 3. The inner sides of the corresponding end portions 8 of the grid member 4 are provided with notches or openings 9 and 10 for the purpose of receiving the springs 5, as will be hereinafter set forth.

The middle portions 11 of the springs 5, which are preferably of approximately V-shape, and are made of strap material, engage lateral projections 11$^a$ between the same and the coil 3, and their end portions extend through the notches 9 and 10 to engage the magnetizable frame or yoke 1, the ends 11$^b$ being preferably bent as indicated. The form and location of the springs are such that they exert constant pressure between the grid members 4 and the frame 1 to maintain the field coils 3 in position and prevent chattering.

Although I have shown and described the notches or openings 9 and 10 as located on the inside of the grids 4, those skilled in the art will readily understand that my invention is not restricted in this respect. Furthermore, the construction of the springs 5 may be varied, and any suitable means for accomplishing the same result may be employed.

Reference may now be had to Figs. 3, 4 and 5, in which like parts bear the same reference characters as hereinbefore designated.

The field magnet frame 1, the polar projections 2 and the main field coils 3 are similar to those already described, and no further description thereof will be given. In this structure, a series field coil 12 surrounds the main field coil 3 and is supported in position by means of grid members 4$^a$ in a manner to be set forth.

The grid members 4$^a$, which are of like construction and are disposed on the opposite ends of the field coils 3, are substantially U-shape in form and comprise arms 13 and 14 and a connecting yoke member 15. The arms 13 and 14 of each grid member are provided with outwardly extending projections 16 to receive the series field coil 12 and to support it in position, while the yoke portion 15 embodies an inwardly projecting portion 17 which rests against one end of the coil 3. The projecting portion 17 is provided with notches or openings 9 and 10, for the purpose of receiving the spring 5, as hereinbefore described in connection with Figs. 1 and 2. Furthermore, the arms 13 and 14 are also provided with ribbed portions 18 which act as spacers to hold the grid members 4ª away from the field coils 3 in order that satisfactory ventilation and radiation may be secured.

In assembling the field coil structure, the component parts are placed in position upon the polar projections 2 before said projections are secured to the magnetizable frame 1 by means of the bolts 6. The main field coils 3 are first placed in position, after which the supporting grid members 4ª are disposed inside of the series field coils 12 in their proper positions. The series field coils 12 and the grid members 4ª are then lowered over the main field coils 3, whereby said grid members are securely held in position. The polar projections 2 and their associated parts are then assembled upon the field magnet frame 1 in the usual manner, it being understood that the springs 5 are disposed in the notches 9 and 10 before so doing.

Such variations in the structural details and in the arrangement and location of parts as may be made by those skilled in the art without materially changing the mode of operation and results are to be understood as included within the spirit and scope of my invention.

I claim as my invention:

1. In a dynamo-electric machine, the combination with a magnetizable frame having a plurality of polar projections, and field coils disposed on said projections, of supporting members for said field coils, and resilient means interlocked with said members and serving to exert a separating pressure between the same and said frame.

2. In a dynamo-electric machine, the combination with a magnetizable frame having a plurality of polar projections, and field coils disposed on said projections, of grids adapted to engage the ends of said coils, resilient means interlocked with said grids and serving to exert a separating pressure between the same and said frame.

3. In a dynamo-electric machine, the combination with a magnetizable frame having a plurality of polar projections, and field coils disposed on said projections, of coil-supporting grids having openings in the opposite ends thereof, and springs seated in said openings and engaging said frame to exert a separating pressure between the same and said coils.

4. In a dynamo-electric machine, the combination with a magnetizable frame having a plurality of polar projections, and field coils disposed on said projections, of a rigid frame disposed against each of said field coils, said rigid frame having slotted openings on the inside edges of oppositely disposed portions thereof, and substantially V-shaped springs disposed in said openings to form a unitary structure with said rigid frame and interposed between said coils and said magnetizable frame.

5. In a dynamo-electric machine, the combination with a magnetizable frame having a plurality of polar projections, and field coils disposed on said projections, of grids disposed against the ends of said coils and severally provided with two adjacent notches in the inside edges of oppositely disposed end portions thereof, and substantially V-shaped springs disposed in said notches to form with said grid a unitary structure and having their middle portions between intermediate projections and the coil and with their outer ends resting against said magnetizable frame.

6. In a dynamo-electric machine, the combination with a magnetizable frame having a plurality of polar projections, and field coils disposed on said projections, of coil-supporting members having notched openings, and springs seated in said notched openings to form with said supporting members a unitary structure and engaging said magnetizable frame to exert a constant separating pressure between the same and said coils.

7. In a dynamo-electric machine, the combination with a magnetizable frame having a plurality of polar projections, and main field coils disposed on said projections, of series field coils surrounding said main field coils, supporting grids disposed upon the ends of said main field coils and adapted to carry said auxiliary field coils, and resilient means interlocked with said grids and bearing against said magnetizable frame.

8. In a dynamo-electric machine, the combination with a magnetizable frame having a plurality of polar projections, and main field coils disposed on said projections, of series field coils surrounding said main field coils, grids disposed upon the ends of said main field coils and having outwardly projecting portions to support said auxiliary coils and inwardly projecting portions to rest upon said main field coils, said inwardly projecting portions being provided with notches or openings therein, and springs that project through said openings and the outer ends of which rest against said magnetizable frame.

9. In a dynamo-electric machine, the combination with a magnetizable frame having a plurality of polar projections and main field coils surrounding said projections, of series field coils concentrically disposed around said main field coils, supporting members for said series field coils disposed intermediate said main and series coils and resilient means for holding said supporting members and coils away from said frame.

In testimony whereof, I have hereunto subscribed my name this 10th day of March, 1911.

CHARLES WILLIAM STARKER.

Witnesses:
W. R. JONES,
B. B. HINES.